April 30, 1963 R. W. GRANT 3,087,507
DIFFERENTIAL VALVE HAVING A TUBULAR DIAPHRAGM
ENCIRCLED BY AN ANNULAR SEALING SURFACE
Filed Jan. 29, 1962 2 Sheets-Sheet 1
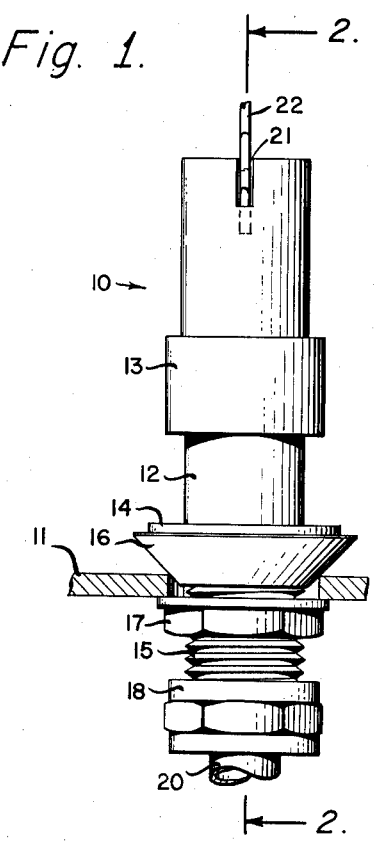
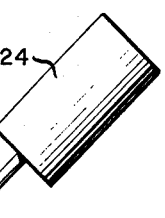
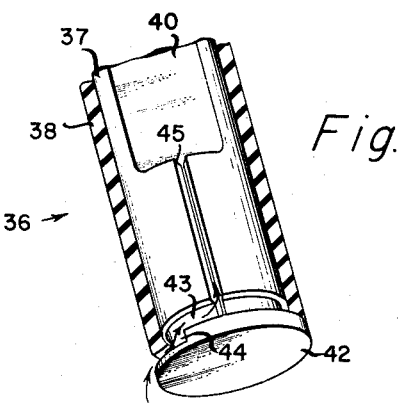
Richard W. Grant,
INVENTOR.
BY.
Noel B. Hammond
AGENT.

April 30, 1963

R. W. GRANT 3,087,507

DIFFERENTIAL VALVE HAVING A TUBULAR DIAPHRAGM
ENCIRCLED BY AN ANNULAR SEALING SURFACE

Filed Jan. 29, 1962

Richard W. Grant,
INVENTOR.

BY.

Noel B. Hammond

AGENT.

United States Patent Office 3,087,507
Patented Apr. 30, 1963

3,087,507
DIFFERENTIAL VALVE HAVING A TUBULAR DIAPHRAGM ENCIRCLED BY AN ANNULAR SEALING SURFACE
Richard W. Grant, 5239 W. 118th Place, Inglewood 2, Calif.
Filed Jan. 29, 1962, Ser. No. 169,271
1 Claim. (Cl. 137—414)

The present invention relates to differential valves suitable for use as float-operated fluid inlet valves and, more particularly, to a differential valve of a generally nonmetallic construction and a coaxial structural configuration having a tubular diaphragm that expands outwardly against and collapses inwardly away from an annular sealing surface.

Heretofore, float-operated water inlet valves, known as ball cock valves, for use in toilet or water closet flush tanks and the like, have been of heavy cast metal construction utilizing a large number of parts having complicated configurations. These conventional valves utilize sealing members mechanically linked to a float to provide gradual closing of a port or seat as the float rises. This has resulted in a valve structure that is expensive, corrodes easily, and in which the sealing member is subject to excessive wear. Furthermore, such valves frequently do not provide a positive shut-off action.

A differential valve overcomes many of the disadvantages of the conventional type of valve. A differential valve (sometimes referred to as a hydraulic amplifier) is one in which a flexible diaphragm is forced against a sealing member by the pressure of the fluid being controlled, rather than by a cumbersome mechanical linkage. The term "differential" refers to the fact that equal and opposite pressures on a diaphragm result in a net force thereon if there is a differential in the areas over which the opposing forces are exerted.

However, a disadvantage of many prior art differential valves is the utilization of a molded diaphragm of involved configuration. Another disadvantage of many prior art differential valves is that the diaphragm must be forcibly stretched away from the sealing member to reach the open position. In a differential valve, the diaphragm is moved only by the pressure of the fluid being controlled. When that pressure is low, the diaphragm moves only slightly. This results in minimal clearance between the diaphragm and the sealing member which may permit particles of sand or other foreign matter to be readily trapped therebetween.

Accordingly, it is an object of the present invention to provide a differential valve suitable for use as a float-operated fluid inlet valve which utilizes a simple diaphragm that opens readily even under conditions of low fluid pressure.

Another object of the invention is the provision of a differential valve suitable for use as a float-operated fluid inlet valve which is simple, inexpensive, durable and positive acting.

In accordance with these and other objects of the invention, there is provided a differential valve made substantially entirely of noncorrosive and inexpensive materials such as plastic and neoprene or the like and having a flexible diaphragm made of a section of extruded tubing. This tubular diaphragm seals against an annular sealing surface encircling the exterior thereof to control the flow of fluid therebetween. The tubular diaphragm readily disengages from the annular sealing surface, not by stretching, but merely by collapsing. Expansion and collapse of the diaphragm is caused by regulating the flow of fluid through the interior of the diaphragm by a pilot valve.

The following specification and the accompanying drawings respectively describe and illustrate an exemplification of the present invention. Consideration of the specification and the drawings will provide an understanding of the invention, including the novel features and objects thereof. Like reference characters are used to designate like parts throughout the figures of the drawings.

FIG. 1 is an elevational view of the exterior of an exemplary embodiment of a valve in accordance with the present invention;

FIG. 2 is an elevational view, partly in cross section along the lines 2—2, of the valve of FIG. 1, showing a tubular diaphragm assembly therein;

FIG. 5 is a perspective view of the lower portion of diaphragm assembly;

Figure 3:
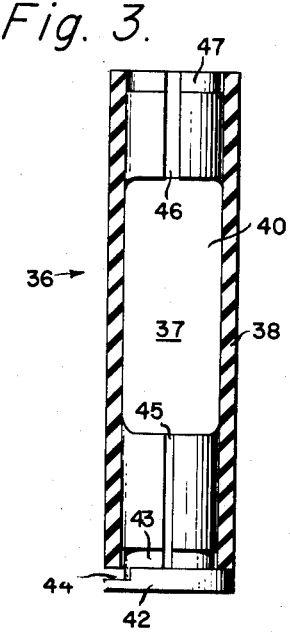
FIG. 3 is an elevational view of the diaphragm assembly of FIG. 2, the diaphragm being shown in cross section.

Referring now to FIG. 1 of the drawings, an embodiment of a valve 10, constructed in accordance with the present invention, is shown mounted in a bottom wall 11 of a water tank. The valve 10 comprises a hollow housing formed of a lower housing member 12 and an upper housing member 13 of nonmetallic material such as plastic or the like. The lower housing member 12 is mounted in a hole in the bottom wall 11 of the tank by means of an annular flange 14, external screw threads 15, a conical sealing washer 16 of rubber or neoprene, and a nut 17. An internally threaded pipe union 18 connects the bottom end of the lower housing member 12 to a source of fluid under pressure such as a water supply pipe 20.

To adapt the valve 10 for operation as a float-controlled water inlet valve, the upper housing member 13 is provided with a slot 21 across the upper end thereof, and into which extends the lower end of a wire float arm 22. Referring now to FIG. 2, the lower portion of the float arm 22 is bent into an M-shaped configuration and the lower extremity thereof rests in a hole 23 provided at the bottom of the slot 21. The diameter of the hole 23 is slightly larger than the diameter of the float arm 22 to permit a rocking motion of the float arm 22 therein. The upper portion of the float arm 22 extends angularly away from the valve 10 and is provided at its extremity with a buoyant float 24.

As may be seen in FIG. 2, the housing members 12 and 13 are fastened together by means of screw threads 31, and a diaphragm assembly 36 is disposed in the hollow interior 35 thereof. The diaphragm assembly 36 includes a flexible tubular diaphragm 38 made of rubber, neoprene, solid polyurethane or the like. The upper end of the discharge diaphragm assembly 36 is retained by being tightly fitted into the upper end of the interior 35 of the upper housing member 13, which is of a reduced diameter thereat. The main valve seat of the valve 10 is an annular sealing surface 32 that coaxially encircles the exterior of the tubular diaphragm 38. The annular sealing surface 32 is a reduced diameter portion of the inner surface of the lower housing member 12. The edges of the annular sealing surface 32 are slightly rounded to prevent damage to the diaphragm 38 when it is expanded thereagainst. Two outlet passages 33 and 34 communicate with the interior 35 of the upper housing member 13 above the annular sealing surface 32. In the present example, the outlet passages 33 and 34 are grooves provided in the threaded portions of the inner wall of the upper housing member 13 on diametrically opposite sides thereof and open downwardly toward the bottom wall 11 of the tank.

Fluid under pressure is applied at the lower end of the diaphragm 38 by the water supply pipe 20. Flow of water through the interior of the diaphragm 38 is controlled by means of a pilot valve 25 disposed at the upper end of the tubular diaphragm 38. The pilot valve 25 is made of plastic and has a stem extending upwardly into the slot 21 through an orifice 26 having a large diameter compared to the diameter of the stem of the pilot valve 25. The pilot valve 25 has a head disposed within a pilot valve chamber 27 inside the upper housing member 13 adjacent the upper end of the diaphragm 38. A neoprene O-ring 28 is tightly fitted into the upper end of the pilot valve chamber 27, encircling the orifice 26 and the stem of the pilot valve 25. The pilot valve 25 has a sealing surface on the head thereof that engages the O-ring 28, sealing the orifice 26. The M-shaped portion of the float arm 22 forms a projection 30 extending adjacent the stem of the pilot valve 25. As the float 24 falls, the projection 30 of the float arm 22 forces the pilot valve 25 askew, unsealing the orifice 26 to provide a passage between the pilot valve chamber 27 and the exterior of the valve 10.

As will be more fully explained hereinafter, when the pilot valve 25 is closed, the flexible tubular diaphragm 38 expands outwardly against the annular sealing surface 32, preventing water from the supply pipe 20 from reaching the water outlet passages 33 and 34. When the pilot valve 25 is open, the diaphragm 38 readily collapses inwardly away from the annular sealing surface 32, permitting water to flow from the supply pipe 20 along the exterior of the diaphragm 38 and through the outlet passages 33 and 34 to the outside of the valve 10.

Figure 4:
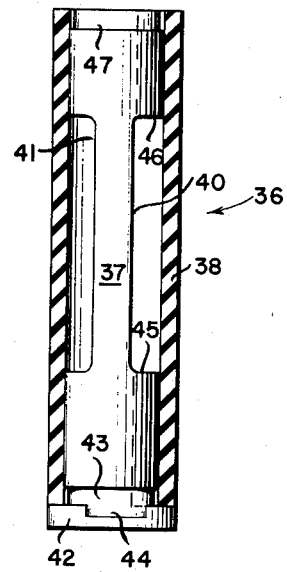
FIG. 4 is an elevational view of the diaphragm assembly rotated 90 degrees with respect to FIG. 3.

Referring now to FIGS. 3, 4 and 5, the diaphragm assembly 36 comprises a longitudinal internal member 37 made of plastic and which is disposed coextensively within the flexible tubular diaphragm 38. The internal member 37 supports the diaphragm 38 and provides a restricted passage for fluid therethrough. Two parallel, planar depressions 40 and 41 are provided on opposite sides of the internal member 37 to permit the inward collapse of the central portion of the diaphragm 38. A circular flange 42 extends outwardly from the lower end of the internal member 37 to support the lower end of the diaphragm 38. The upper end of the internal member 37 is provided with an annular recess 47 for ease of insertion of the diaphragm assembly 36 into the upper end of the interior 35 of the upper housing member 13.

Water enters the interior of the diaphragm 38 through a notch 44 in the flange 42, and flows under the lower end of the diaphragm 38 and into an annular recess 43 adjacent the flange 42 and beneath the diaphragm 38, through a narrow groove 45 into the cavity within the diapraghm 38 formed by the planar depressions 40 and 41, and from thence through a wide groove 46 and out the upper end of the diaphragm assembly 36. The flow of water through the interior of the diaphragm 38 is not of large volume but is sufficient, if its egress is restricted, to cause expansion of the diaphragm 38.

The provision of the narrow groove 45 as an inlet to the cavity formed by the planar depressions 40 and 41 in conjunction with the provision of the wide groove 46 as an outlet therefrom, assures the rapid collapse of the diaphragm 38 when the pilot valve 25 is open because water can leave the interior of the diaphragm 38 at a greater rate than it can enter. The provision of the notch 44 in the flange 42 is an inlet to the annular recess 43 of the internal member 37 results in the prevention of foreign matter such as particles of sand or pieces of scale from entering the diaphragm assembly 36 and clogging the channels.

Figure 6:
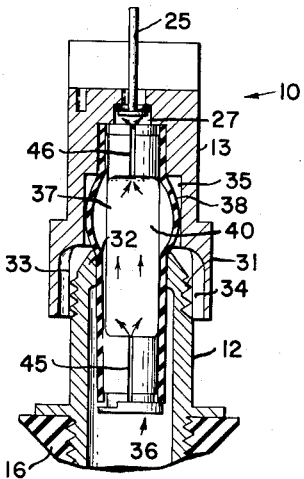
FIG. 6 is an elevational view of the valve, partly in cross section, showing the valve in operation in the closed position.

FIG. 6 shows the valve 10 in operation in the closed position. The water under pressure, applied to the diaphragm 38 at the lower end thereof by the water supply pipe 20, rapidly fills the interior of the diaphragm 38. The pilot valve 25 is closed, which prevents the outflow of water from the interior of the diaphragm 38. The pressure on the interior surface of the diaphragm 38 is the same as that on the portion of the exterior surface of the diaphragm 38 which is below the restriction formed by the annular sealing surface 32. Although these pressures are equal and opposite, the interior pressure is exerted over substantially all of the interior surface of the diaphragm 38, the exterior pressure is exerted over only a portion of the exterior surface of the diaphragm 38. Due to this differential in areas, the net force on the diaphragm 38 is outward, causing the diaphragm 38 to expand until it contacts and seals against the annular sealing surface 32. Thus, the water under pressure applied to the exterior of the diaphragm 38 at the lower end thereof by the water supply pipe 20, is prevented from reaching the water outlet passages 33 and 34.

Figure 7:
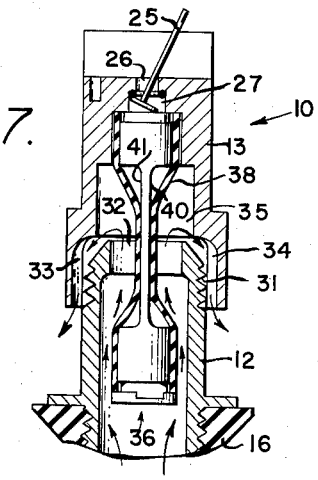
FIG. 7 is an elevational view of the valve, partly in cross section, showing the valve in operation in the open position.

FIG. 7 shows the valve 10 in operation in the open position. For clarity in illustrating the action of the diaphragm 38, the diaphragm assembly 36 is shown rotated 90 degrees in the housing members 12 and 13 from the position in which it is shown in FIG. 6. The pilot valve 25 is open, releasing the water in the interior of the diaphragm 38 which had maintained the diaphragm 38 in a distended condition. Water under pressure applied to the exterior of the diaphragm 38 at the lower end thereof by the water supply pipe 20, forces the diaphragm 38 to collapse inwardly against the planar depressions 40 and 41. Water present in or entering the interior of the diaphragm 38 is able to leave freely through the wide groove 46 and the orifice 26 to permit the diaphragm 38 to collapse rapidly. The water from the supply pipe 20 then flows along the exterior of the diaphragm 38, past the annular sealing surface 32, and out the water outlet passages 33 and 34.

Due to the utilization of the water pressure itself to open and close the valve, the opening and closing action is rapid and positive-acting rather than being gradually accomplished in accordance with the position of the float. Except for the float arm and mounting hardware, which is external to the valve itself, the valve is of a nonmetallic construction, being fabricated of plastic and neoprene or the like. Accordingly, the valve is inexpensive and not subject to rust and corrosion. The flexible diaphragm is of a simple configuration, being merely a section of inexpensive extruded tubing. The only moving parts within the valve are the pilot valve and the diaphragm. These parts are subject to very little wear because the sealing surfaces are neoprene or the like against plastic and because the opening and closing motion is not of a sliding or rotating type. The diaphragm is sufficiently strong and resilient to easily withstand repeated flexure. The tubular diaphragm readily disengages from the annular sealing surface, not by stretching, but merely by collapsing. Thus, even under conditions of very low fluid pressure, the diaphragm is fully withdrawn from the sealing surface, providing little or no opportunity for the entrapment of foreign matter.

Although the valve of the present invention has been described as operating in conjunction with a float, the valve may be operated in other modes. For example, the pilot valve may be manually operated, if desired. Furthermore, the valve of the present invention may be used with fluids other than water, and including gases. The diaphragm need not necessarily be provided with an internal member and may be moulded in a configuration providing sufficient longitudinal support and a restricted entry passage into the interior thereof.

If the valve is to be used as a water inlet valve for a toilet tank, a bowl refill tube may be provided. The refill tube may be a length of plastic tubing that extends from the interior of the valve above the annular valve seat and out to the toilet tank overflow pipe. The downward opening water outlet passages will be found ideal for use of the valve in a toilet tank. For other uses, the water outlet passages may open outwardly in other directions.

Thus, there has been described a differential valve suitable for use as a float-operated fluid inlet valve which utilizes a simple diaphragm that opens readily even under conditions of low fluid pressure. The valve is simple, inexpensive, durable and positive acting.

While only one embodiment of the invention has been shown and described, modification may be made and it is intended in the appended claim to cover all such modifications as may fall within the true spirit and scope of the invention.

What is claimed is:

A differential valve comprising: a rigid housing having a hollow interior including a central portion defining an annular sealing surface, said housing having an inlet for fluid under pressure opening into said interior on one side of said annular sealing surface, said housing having an outlet for fluid opening out of said interior on the other side of said annular sealing surface; a flexible tubular diaphragm disposed within said interior of said housing and extending coaxially through said annular sealing surface and in immediate proximity thereto; a generally cylindrical rigid internal member disposed within and substantially coextensive with said diaphragm and having the outer surface thereof recessed inwardly away from said diaphragm at a central portion thereof to provide two oppositely disposed planar depressions enabling collapse of said diaphragm away from said annular sealing surface, said internal member having a first passage for fluid extending from said inwardly recessed central portion to an end of said internal member proximate to said inlet for fluid, said internal member having a second passage for fluid extending from said inwardly recessed central portion to an end of said internal member distant from said inlet for fluid, said first passage being of smaller volumetric capacity than said second passage; and a float-controlled pilot valve disposed in said housing adjacent said second passage in said internal member for selectively controlling the communication of said second passage with the exterior of said housing.

References Cited in the file of this patent
UNITED STATES PATENTS

| | | |
|---|---|---|
| 2,608,213 | Hruby | Aug. 26, 1952 |
| 2,731,979 | Crockett | Jan. 24, 1956 |

FOREIGN PATENTS

| | | |
|---|---|---|
| 986,047 | France | Mar. 21, 1951 |